I. D. PECK.
Pitchfork.
No. 44,652. Patented Oct. 11, 1864.
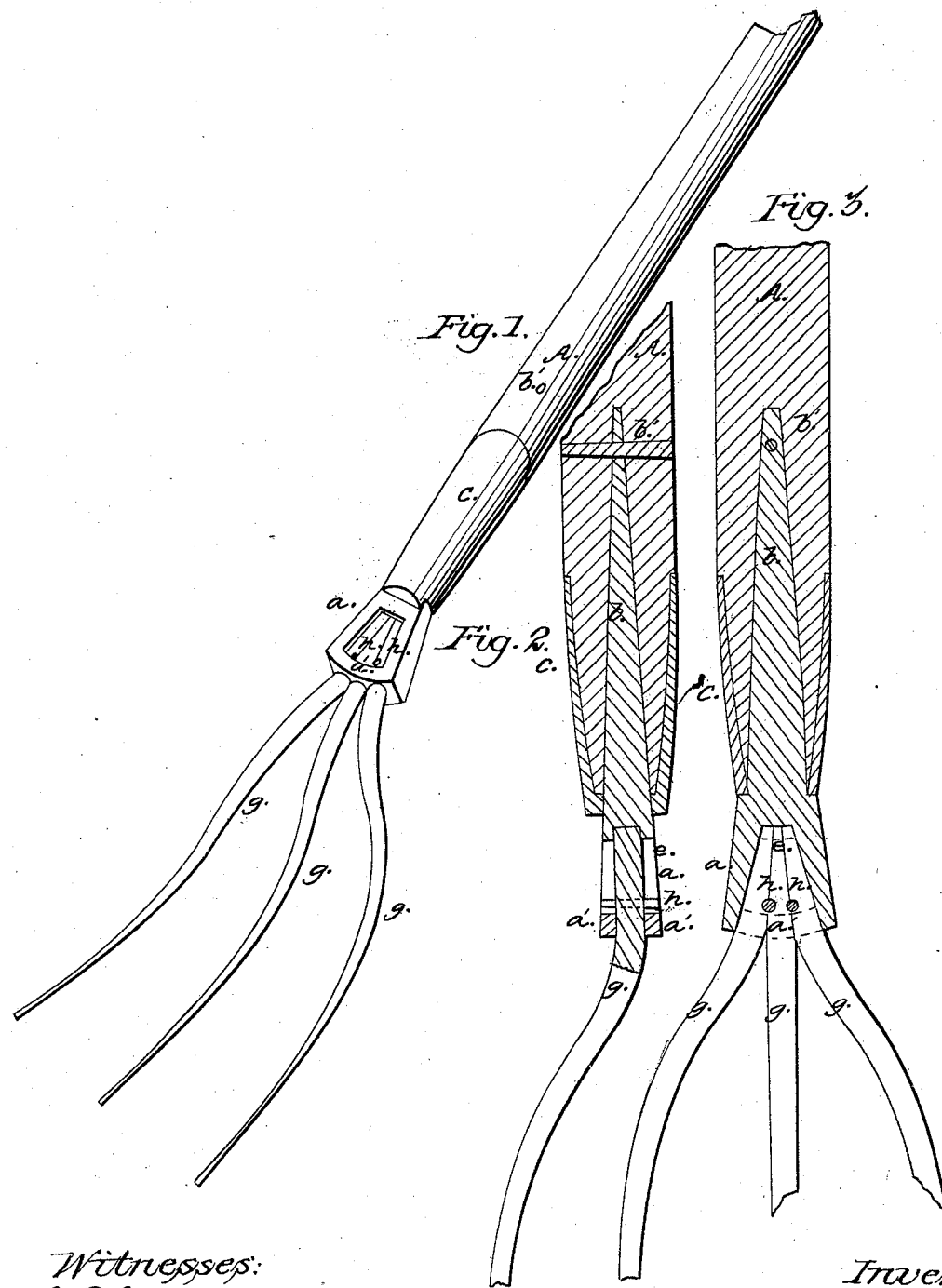

UNITED STATES PATENT OFFICE.

ISAAC D. PECK, OF SOUTH BRISTOL, NEW YORK.

IMPROVEMENT IN PITCHFORKS.

Specification forming part of Letters Patent No. 44,652, dated October 11, 1864.

*To all whom it may concern:*

Be it known that I, ISAAC D. PECK, of South Bristol, Ontario county, State of New York, have invented a new and Improved Pitchfork; and I do hereby declare that the following is a full, clear, and exact description thereof, reference being had to the accompanying drawings, making a part of this specification, in which—

Figure 1 is a perspective view of my improved fork. Fig. 2 is a sectional view, showing the arrangement of the tines in their socket and the manner of securing the latter to the handle. Fig. 3 is a section taken in a plane at right angles to that of Fig. 2.

Similar letters of reference indicate corresponding parts in the three figures.

This invention relates to an improvement on pitchforks which are so constructed that any one or all of their tines can be removed or replaced at pleasure, with the view to a renewal of the tines should they become broken.

The object of my invention is to provide for securing the tines into their socket more firmly than hitherto, at the same time to provide for readily removing them when desired, as will be hereinafter described.

To enable others skilled in the art to make and use my invention, I will describe its construction and operation.

In the accompanying drawings, $a$ represents a metallic box, which is formed on the end of a tapering tang, $b$, which is inserted into the end of the handle A, and secured rigidly therein by means of a key-pin, $b'$, and a ferrule, $c$, as shown in Figs. 2 and 3. Thus it will be seen that the box, with its tang, can be detached from the handle A by removing the pin $b'$.

My invention consists in forming a tapering socket or recess in the end of the box $a$ for receiving the shanks of the tines $g\ g\ g$, and in securing these tines in place by means of key-pins, which pass between them and wedge them out laterally, and thus confine them rigidly within their box $a$. The box $a$ may have its upper and lower sides opened, as shown in the drawings, in which case it will be necessary to form or leave a recess, $e$, to receive the tapered ends of all the shanks, and also abutments $a'\ a'$ for the ends of the keys $h\ h$. The shanks of the tines are made so that they will all together fit snugly into the socket-box $a$ before the keys $h$ are inserted between them. Then when these keys are inserted they will not only prevent the tines from being withdrawn, but hold them rigidly in place. When three tines are used, as shown in the drawings, two keys, $h\ h$, inserted on each side of the central tine, $g$, will secure this as well as the two outer tines in place; and where only two tines are used a single pin or key inserted between their shanks will hold them in place. The holes for the reception of the keys $h$ are made between the shanks of each pair of tines, so that said keys will partially enter each one of the shanks.

It will be seen from the above description that any one or all of the tines of my fork can be removed by simply driving out the key-pins $h$; also, that these pins wedge the shanks of the tines in their box $a$ and form a rigid attachment when the keys are firmly driven in their places.

What I claim as new, and desire to secure by Letters Patent, is—

Securing the tapering shanks of the tines of a fork into a correspondingly-tapered recess formed in a socket-piece, $a$, by means of wedges or keys inserted between the shanks, substantially as described.

ISAAC D. PECK.

Witnesses:
B. T. WHEELER,
SAML. W. SALISBURY.